United States Patent [19]

Willard

[11] 4,362,706

[45] Dec. 7, 1982

[54] STABILIZER SYSTEM FOR COMMERCIAL HYDROGEN PEROXIDE

[75] Inventor: Paul E. Willard, Skillman, N.J.

[73] Assignee: FMC Corporation, Philadelphia, Pa.

[21] Appl. No.: 323,168

[22] Filed: Nov. 20, 1981

[51] Int. Cl.$^3$ .................. C01B 15/37; C01B 15/01
[52] U.S. Cl. .................. 423/273; 423/272; 423/584; 252/186.29
[58] Field of Search .................. 423/272, 273, 584; 252/186, 400 A, 406

[56] References Cited

U.S. PATENT DOCUMENTS

| | | | |
|---|---|---|---|
| 1,002,854 | 9/1911 | Liebkneckt | 423/272 |
| 1,916,438 | 7/1933 | Rather et al. | |
| 2,373,049 | 4/1945 | Pedersen | 44/74 |
| 3,264,324 | 8/1966 | Gould et al. | 260/347.8 |
| 3,383,174 | 5/1968 | Carnine et al. | 423/272 |
| 3,681,022 | 8/1972 | Kibbel et al. | 423/272 |
| 3,687,627 | 8/1972 | Stalter | 423/271 |
| 3,701,825 | 10/1972 | Radimer | 423/273 |
| 3,701,825 | 10/1972 | Radimer et al. | 423/273 |
| 3,781,409 | 12/1973 | Munday et al. | 423/273 |
| 3,801,512 | 4/1974 | Solenberger | 252/186 |
| 3,864,271 | 2/1975 | Stalter | 252/99 |
| 3,903,244 | 9/1975 | Winkley | 423/272 |
| 4,059,678 | 11/1977 | Winkley | 423/273 |
| 4,061,721 | 12/1977 | Strong | 423/272 |
| 4,070,442 | 1/1978 | Watts | 423/272 |
| 4,304,762 | 12/1981 | Leigh | 423/272 |

FOREIGN PATENT DOCUMENTS

| | | | |
|---|---|---|---|
| 729098 | 3/1966 | Canada | 423/584 |
| 848876 | 8/1970 | Canada | 423/584 |
| 51-64082 | 3/1976 | Japan | 252/186 |

OTHER PUBLICATIONS

Schumb, et al., "*Hydrogen Peroxide*", American Chemical Society Monograph Series, New York: Reinhold Publishing Corporation, 1955.
Kirk–Othmer, "*Encyclopedia of Chemical Technology*", vol. 13, 3rd Edition, John Wiley & Sons: New York, 1981.

*Primary Examiner*—Gary P. Straub
*Attorney, Agent, or Firm*—Richard E. Elden; Eugene G. Horsky

[57] ABSTRACT

Stabilizer formulations have been developed for commercial hydrogen peroxide stored in stainless steel containers. These stabilizers, which include benzene phosphonous acid, 2,2'-dithiobenzoic acid, 1-allyl-thiourea, and thiocarbanilide are effective in the presence of typical decomposition catalysts when used in conjunction with typical organic phosphonic stabilizer systems, even when the commercial organic phosphonic stabilizers are present in less than the usually recommended quantities.

6 Claims, No Drawings

STABILIZER SYSTEM FOR COMMERCIAL HYDROGEN PEROXIDE

This invention relates to stabilizer systems for commercial hydrogen peroxide.

Although pure hydrogen peroxide is unstable thermodynamically, it is not subject to natural autodecomposition processes when pure. Hydrogen peroxide, however, is subject to decomposition by heterogeneous or homogenous catalysts. The stabilizer system selected for hydrogen peroxide depends on the quantity and nature of the decomposition catalyst with which the hydrogen peroxide is expected to be contacted. For example, very pure hydrogen peroxide being stored by the manufacturer in large tanks needs very little stabilizer; while hydrogen peroxide being shipped and diluted on the spot with tap water of an uncertain catalyst content requires higher concentrations of stabilizers.

The majority of hydrogen peroxide stabilization studies have been directed towards the stabilization of the hydrogen peroxide in concentrated solution in aluminum containers, either highly concentrated hydrogen peroxide which has been diluted with ordinary tap water or distilled water containing possible contaminants, such as iron and copper. Examples of such commercial formulations include U.S. Pat. No. 3,781,409; U.S. Pat. No. 3,681,022; U.S. Pat. No. 3,383,174; U.S. Pat. No. 3,701,825; and U.S. Pat. No. 4,061,721. These formulations are typical of hydrogen peroxide shipped in commerce and include those stabilized with organic compounds, such as an organic phosphonic acids which are well-known in the art as stabilizers for hydrogen peroxide either with or without added tin compounds. The combined effect of mixing two different stabilizer systems is rarely additive; the result may exceed the sum of the effects of the individual stabilizer components or the stabilizers may cancel each other and may result in little or no stabilization effect whatsoever.

It has been found that commercial hydrogen peroxide solutions can be stabilized for storage in stainless steel containers when containing, in addition to a conventional organic phosphonic acid stabilizer system, a compound selected from the group consisting of benzene phosphonous acid, 2,2'-dithiodibenzoic acid, 1-allyl-2-thiourea, thiocarbanilide, and salts thereof. It has been found that these materials, although ineffective by themselves as stabilizers, increase the effectiveness of other stabilizers commonly used in commercial hydrogen peroxide, such as soluble tin salts and organic phosphonic acids.

The stabilized hydrogen peroxide compositions of the invention may be prepared by any convenient method. For example, the stabilizers of this invention may be added directly to hydrogen peroxide and blended in a tank with hydrogen peroxide containing commercial organic phosphonic acid stabilizers, or may be added along with other stabilizers in a stock solution as taught in U.S. Pat. No. 3,781,409, or the stabilizers may be added directly to stabilized hydrogen peroxide containing organic phosphonic acids. It is preferred that the pH of the hydrogen peroxide be adjusted to the optimum according to the concentration of the hydrogen peroxide using an acid or a base as required. For example, pH 1.5–2.0 for 70% hydrogen peroxide, pH 1.8–2.2 for 50% hydrogen peroxide, or pH 3.0–3.75 for 35% hydrogen peroxide are optimum.

It is convenient to refer to the concentrations of stabilizer as a percent by weight of the hydrogen peroxide in solution to eliminate confusion on dilution of concentrated solutions. Therefore, all concentrations will be given on that basis in the specification.

The relative proportions of the stabilizers of this invention and the commercial organic phosphonic acid stabilizers are not critical. Preferably, the organic phosphonic acid stabilizers should be in the range of 25% to 140% of the usually recommended range for "Standard" and "Technical" hydrogen peroxide as defined below. It is more preferable, for economy, that the organic phosphonic stabilizers be present at about 25%–70% of the usually recommended concentration. The stabilizers of the present invention may be present over a wide range of concentrations from 0.001% up to an optimum 0.05% of the weight of the hydrogen peroxide in the solution; an even greater concentration of stabilizer may be used, but there is little economic advantage in increasing the stabilizer beyond 0.1%.

Aqueous hydrogen peroxide solutions stabilized in accordance with the invention disclosed herein are effectively stabilized in the presence of stainless steel and even in the presence of additional heavy metal ions.

EXPERIMENTAL

An aqueous decomposition catalyst stock solution was prepared according to the procedure of U.S. Pat. No. 3,681,022. A hydrogen peroxide sample containing 2.5 ml of the stock solution contained the following concentrations of metal ions: 0.25 mg/l aluminum, 0.25 mg/l iron, 0.05 mg/l copper, 0.025 mg/l manganese, and 0.012 mg/l chromium.

The procedure for determining the stability and compatibility of the hydrogen peroxide with metals was as follows: Coupons of 316 stainless steel were sanded to remove any film, cleaned, and then passivated. The metal coupons, 7.6 cm×1.25 cm×0.16 cm (3 inch×½ inch×1/16 inch), were half immersed in 75 ml of hydrogen peroxide. The surface area exposed to the liquid approximated the 0.84 cm$^{-1}$ (0.33 inch$^{-1}$) surface to volume ratio of a commercial 113 kg (250 pound) hydrogen peroxide drum. The coupons were exposed to the hydrogen peroxide for 28 days at 30° C. To increase the severity of the test, the decomposition catalyst was added to the hydrogen peroxide as explained above.

The stability of each test sample was measured at a temperature of 100° C. for 24 hours following the procedure of Kibbel, et al. in U.S. Pat. No. 3,681,022. The results are expressed as the percentage of hydrogen peroxide retained: the higher the stability, the more effective the stabilizer system. In addition, the active oxygen loss during 28 days at 30° C. exposure to the metal coupons was determined. All tests were run in duplicate and the averages reported.

A special grade of 50% hydrogen peroxide containing only 3.2 mg/l (0.00056% by weight) sodium stannate and 2.6 mg/l (0.00043% by weight) sodium nitrate was used to prepare the solutions unless otherwise noted (hereafter "Unstabilized").

Two commercial hydrogen peroxide stabilizer stock solution formulations were used to evaluate the new stabilizers. They were: (1) a formulation similar to that described in U.S. Pat. No. 3,383,174, containing 150 g/l sodium stannate, plus 100 g/l nitrilo tri(methylenephosphonic acid) (hereafter "Standard") and (2) a formulation described in U.S. Pat. No. 3,701,825 containing 350 g/l ethylenediamine tetra(methylenephosphonic acid)

plus 50 g/l sodium nitrate (hereafter "Technical"). The addition of 1.42 parts per thousand of either stock solution to Unstabilized hydrogen peroxide would result in the corresponding commercial 50% hydrogen peroxide formulation with 100% of the usually recommended stabilizer. The stabilizer concentration in the Standard Formulation would then be 0.035% stannate salt and 0.027% nitrilo tri(methylenephosphonic acid) while the Technical formulation would contain 0.081% ethylenediamine tetra(methylenephosphonic acid) by weight of the hydrogen peroxide in solution.

EXAMPLE 1

Hydrogen peroxide formulations were prepared using Unstabilized hydrogen peroxide alone and with 300 ppm (0.05% by weight) of either benzene phosphonous acid, 2,2'-dithiobenzoic acid, 1-allyl-2-thiourea, or thiocarbanalide. The samples were contaminated with the decomposition catalyst and stored for 28 days in the presence of stainless steel coupons. Comparative examples of Standard hydrogen peroxide were also evaluated.

Table 1 shows the generally poor performance of the four stabilizers alone, when compared with the Standard formulation. Even when the latter was contaminated with the decomposition catalyst little active oxygen was lost on storage, and the 24-hour stability at the end of the storage period was excellent.

EXAMPLE 2

Hydrogen peroxide formulations were prepared of Standard and Technical hydrogen peroxide, both at 140% of the usual stabilizer content for commercial 50% hydrogen peroxide (2 ml of stock solution/l) and at 70% (1 ml of stock solution/l). The test stabilizers were added to the solutions along with the decomposition catalyst. The 24-hour stability of the samples was determined and is reported in Table II.

The results indicate that the test stabilizer, while unsatisfactory alone, improved the stability of the commercial formulations. This effect was observed even when the commercial stabilizer was present at less than the normal concentration.

EXAMPLE 3

Hydrogen peroxide formulations were prepared with 25% and 50% of the commercial levels of Standard and Technical stabilizer. To these solutions were added 300 ppm (0.05% by weight) of the new stabilizer and the decomposition catalyst. The samples were stored at 30° C. for 28 days in the presence of the stainless steel coupons. At the conclusion of the test, the loss of active oxygen on standing was determined, as well as the 24-hour stability of the remaining hydrogen peroxide. The results are presented in Table III.

EXAMPLE 4

A commercially obtained sample of 50% hydrogen peroxide, stabilized according to the Standard formulation plus 0.05% by weight of the test stabilizers added, was evaluated on storage in the presence of the decomposition catalyst and stainless steel coupons. The 24-hour stability of the samples was determined both before and after storage, and the percent weight loss of the coupon and the percent loss of active oxygen on storage were also determined. The results are presented in Table IV.

Although the stability of the commercial sample with the added stabilizers did not match the stability of the laboratory approximation, as indicated in Table I, the improvement in the stability shown by the use of the combination of stabilizers was clearly demonstrated.

TABLE I

EVALUATION OF NEW STABILIZERS
Comparative Examples
Storage Test, 28 Days at 30° C. in the Presence of 316 SS

| Candidate Stabilizer | Decomp. Cat. | Initial Stability | Percent Active Oxygen Loss | Stability After Exposure* |
|---|---|---|---|---|
| 50% Standard | | | | |
| None Added | No | 98.80 | 0.9 | 97.91 |
| None Added | Yes | NA | 0.6 | 97.44 |
| 50% Unstabilized | | | | |
| None Added | No | 98.82 | 27.2 | 18.13 |
| None Added | Yes | NA | 75.3 | 0.00 |
| 300 mg/l Benzene Phosphonous Acid | Yes | NA | 8.7 | 0.00 |
| 300 mg/l 2,2'-Dithiobenzoic Acid | Yes | NA | 86.9 | 0.00 |
| 300 mg/l 1-Allyl-2-Thiourea | Yes | NA | 100.0 | NA |
| 300 mg/l Thiocarbanilide | Yes | NA | 97.7 | 0.00 |

NA - Not applicable
*Target

TABLE II

STABILITY OF 50% HYDROGEN PEROXIDE IN THE PRESENCE OF MIXED STABILIZER SYSTEMS WITH 140% AND 70% OF USUAL COMMERCIAL STABILIZER ADDED

| TEST STABILIZER ADDITION OF (300 mg/l) | STANDARD | | TECHNICAL | |
|---|---|---|---|---|
| | 140% | 70% | 140% | 70% |
| None (Control) | 96.0 | 96.4 | 94.4 | 93.3 |
| Benzene Phosphonous Acid | 97.9 | 97.6 | 96.5 | 96.5 |
| 2,2'-Dithiobenzoic Acid | 97.7 | 97.3 | 96.2 | 95.0 |
| 1-Allyl-2-Thiourea | 98.1 | 97.7 | 95.0 | 94.2 |
| Thiocarbanilide | 98.4 | 97.2 | 96.5 | 93.7 |

The stability of Unstabilized hydrogen peroxide with decomposition catalyst was 86.4.

TABLE III

STORAGE TESTS IN THE PRESENCE OF 316 STAINLESS STEEL 50% HYDROGEN PEROXIDE PLUS DECOMPOSITION CATALYST
(28 days at 30° C.)

| Candidate Stabilizer 300 mg/l | Standard Stabilizer ml/l | Technical Stabilizer ml/l | Active Oxygen Loss % | Stability After Exposure % |
|---|---|---|---|---|
| None (Control) | | | | |
| 1 | — | — | 62.0 | 13.8 |
| 2 | 0.70 | — | 2.8 | 85.9 |
| 3 | 0.35 | — | 3.8 | 88.5 |
| 4 | — | 0.70 | 2.7 | 90.4 |
| 5 | — | 0.35 | 3.2 | 0.0 |
| Benzene Phosphonous Acid | | | | |
| 1 | — | — | 8.7 | 0.0 |
| 2 | 0.70 | — | 1.1 | 98.0 |
| 3 | 0.35 | — | 1.3 | 96.9 |
| 4 | — | 0.70 | 1.3 | 97.2 |
| 5 | — | 0.35 | 1.2 | 97.3 |
| 2,2'-Dithiobenzoic Acid | | | | |
| 1 | — | — | 86.9 | 0.0 |
| 2 | 0.70 | — | 2.4 | 83.3 |
| 3 | 0.35 | — | 2.2 | 33.2 |

TABLE III-continued

STORAGE TESTS IN THE PRESENCE OF 316
STAINLESS STEEL 50% HYDROGEN PEROXIDE
PLUS DECOMPOSITION CATALYST
(28 days at 30° C.)

| Candidate Stabilizer 300 mg/l | Standard Stabilizer ml/l | Technical Stabilizer ml/l | Active Oxygen Loss % | Stability After Exposure % |
|---|---|---|---|---|
| 4 | — | 0.70 | 2.2 | 95.4 |
| 5 | — | 0.35 | 2.2 | 0.0 |
| 1-Allyl-2-Thiourea | | | | |
| 1 | — | — | 100.0 | NA |
| 2 | 0.70 | — | 2.2 | 94.4 |
| 3 | 0.35 | — | 2.1 | 70.2 |
| 4 | — | 0.70 | 1.4 | 95.3 |
| 5 | — | 0.35 | 1.7 | 91.8 |
| Thiocarbanilide | | | | |
| 1 | — | — | 97.7 | 0.0 |
| 2 | 0.70 | — | 1.4 | 92.2 |
| 3 | 0.35 | — | 1.3 | 65.6 |
| 4 | — | 0.70 | 1.1 | 95.8 |
| 5 | — | 0.35 | 1.0 | 94.3 |

(0.70 and 0.35 ml/l of stabilizer is equivalent to 25% and 50% of the usually recommended stabilizer concentration as used in commercial practice.)

TABLE IV

STABILITY AND CORROSION TESTS OF
STANDARD HYDROGEN PEROXIDE IN THE
PRESENCE OF TEST STABILIZER

| Standard Formulation Plus Stabilizer Added at 300 mg/l | 24-hour Stability Initial % | After Exposure % | AO Loss On Storage % | 316 SS Coupon Weight Loss |
|---|---|---|---|---|
| None* (Control) | 99.40 | 72.42 | 3.38 | 0.34 |
| None (Control) | 98.83 | 64.00 | 3.16 | 0.34 |
| Benzene Phosphonous Acid | 99.93 | 96.99 | 0.84 | 0.34 |
| 2,2'-Dithiobenzoic Acid | 100.00 | 97.31 | 1.81 | 0.34 |
| 1-Allyl-2-Thiourea | 99.75 | 96.89 | 1.88 | 0.34 |
| Thiocarbanilide | 99.88 | 97.28 | 0.00 | 0.34 |

*No decomposition catalyst added

I claim:

1. A composition comprising an aqueous hydrogen peroxide solution and a stabilizing amount of an organic phosphonic acid and a stabilizing amount of a compound selected from the group consisting of benzene phosphonous acid, 2,2'-dithiobenzoic acid, 1-allyl-2-thiourea, thiocarbanilide, and salts thereof.

2. The composition of claim 1 further comprising a stabilizing amount of a soluble stannate salt and nitrilo tri(methylenephosphonic acid) as the organic phosphonic acid.

3. The composition of claim 1 further comprising ethylenediamine tetra(methylenephosphonic acid) as the organic phosphonic acid.

4. The composition of claim 1, 2, or 3 in which the stabilizing compound is present in the amount of 0.05% by weight of hydrogen peroxide.

5. The composition of claim 2 in which the stabilizing compound is present in the amount of 0.05% by weight of the hydrogen peroxide and the stannate salt is present in the amount of 0.006% to 0.035% by weight of the hydrogen peroxide and the nitrilo tri(methylenephosphonic acid) is present in the amount of 0.005% to 0.027% by weight of the hydrogen peroxide.

6. The composition of claim 3 in which the stabilizing compound is present in the amount of 0.05% by weight of the hydrogen peroxide, and the ethylenediamine tetra(methlenephosphonic acid) is present in the amount of 0.015% to 0.081% by weight of the hydrogen peroxide.

* * * * *